United States Patent
Gruber

(10) Patent No.: US 7,131,424 B2
(45) Date of Patent: Nov. 7, 2006

(54) METHOD FOR INJECTING FUEL INTO A COMBUSTION CHAMBER OF AN INTERNAL COMBUSTION ENGINE

(75) Inventor: Gerhard Gruber, Backnang (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 11/010,955

(22) Filed: Dec. 13, 2004

(65) Prior Publication Data

US 2005/0188946 A1    Sep. 1, 2005

Related U.S. Application Data

(63) Continuation-in-part of application No. PCT/EP03/06086, filed on Jun. 11, 2003.

(30) Foreign Application Priority Data

Jun. 15, 2002   (DE) ................... 102 26 692

(51) Int. Cl.
*F02D 41/30* (2006.01)
*F02D 17/02* (2006.01)
(52) U.S. Cl. ..................... 123/299; 123/481
(58) Field of Classification Search ............. 123/299, 123/300, 481, 198 DB, 198 F; 701/103–105
See application file for complete search history.

(56) References Cited

U.S. PATENT DOCUMENTS

| | | |
|---|---|---|
| 6,012,428 A | 1/2000 | Yano et al. |
| 6,491,016 B1 * | 12/2002 | Buratti .................... 123/299 |
| 6,837,042 B1 * | 1/2005 | Colignon et al. ........... 60/286 |
| 2005/0126535 A1 * | 6/2005 | Nishimaki ................. 123/299 |

FOREIGN PATENT DOCUMENTS

| | | |
|---|---|---|
| DE | 195 27 775 | 2/1996 |
| DE | 196 32 650 | 3/1998 |
| DE | 198 29 308 | 3/1999 |
| DE | 198 44 746 | 2/2000 |
| DE | 199 52 380 | 5/2001 |
| EP | 0 953 756 | 11/1999 |
| EP | 1 081 365 | 3/2000 |
| EP | 1 132 607 | 9/2001 |
| EP | 1 138 921 | 10/2001 |
| JP | 11 173186 | 6/1999 |
| WO | WO 00/17501 | 3/2000 |
| WO | WO 01/66927 | 9/2001 |
| WO | WO 02/25088 | 3/2002 |

* cited by examiner

Primary Examiner—Hai Huynh
(74) Attorney, Agent, or Firm—Klaus J. Bach

(57) ABSTRACT

In a method of injecting fuel into the combustion chambers of an internal combustion engine having a plurality of cylinders, wherein a main injection process and a variable number of secondary injection processes assigned to the main injection process are carried out during one working cycle of a piston, a change of the number of secondary injection processes is initiated initially only for some of the cylinders, while the original number of secondary injection processes is maintained for the other cylinders. Subsequently, the proportion of the cylinders to which the change of the number of secondary injection processes is applied is increased.

6 Claims, 1 Drawing Sheet

METHOD FOR INJECTING FUEL INTO A COMBUSTION CHAMBER OF AN INTERNAL COMBUSTION ENGINE

This is a Continuation-In-Part Application of international application PCT/EP03/06086 filed Jun. 11, 2003 and claiming the priority of German application 102 26 692.1 filed Jun. 15, 2002.

BACKGROUND OF THE INVENTION

The invention relates to a method of injecting fuel into the combustion chambers of an internal combustion engine having a plurality of cylinders by a main injection process and a variable number of secondary injection processes.

It is already known, for example, from EP 1 132 607 A2 to carry out one or more pre-injection processes before the actual main injection process during one working cycle of the piston of an internal combustion engine. EP 1 138 921 A2, EP 1 081 365 A2 or DE 196 32 650 C1 describe further similar methods of injecting fuel.

The division of a fuel injection procedure into at least one pre-injection process and the main injection process achieves a reduction of the combustion chamber pressure gradient and therefore a slower pressure build-up in the combustion chamber. This leads to improved noise behavior of the internal combustion engine and a more accurate operation of the engine.

In this context, in particular in ranges with a low rotational speed, two pre-injection processes per working cycle of the piston are also frequently used, whereas no pre-injection process and merely one main injection process are frequently used in ranges of a high engine speed for reasons of improved performance yield. To this extent, one can speak of a variable number of pre-injection processes per main injection process. As it is also possible to carry out further injection processes of small amounts of fuel after the main fuel injection process, that is to say "post-injection processes", pre-injection and post-injection are summarized by the term "secondary injections".

In the transitional ranges where the change is made from an original number of secondary injection processes per working cycle or per main injection process to a changed number of secondary injection processes, problems frequently occur, however, with regard to the ability to regulate the injection process, as well as the torque and performance output, the exhaust-gas behavior, the rotational speed stability and the noise behavior of the internal combustion engine. In this connection, it is insignificant whether the number of secondary injection processes is increased or reduced during the method.

It is therefore the principal object of the present invention to provide a method for injecting fuel into the combustion chambers of an internal combustion engine, in which the transition between different numbers of secondary injection processes per associated main injection process does not lead to an impairment of the operation of the internal combustion engine, that is, to a method in which such transition proceeds harmoniously.

SUMMARY OF THE INVENTION

In a method of injecting fuel into the combustion chambers of an internal combustion engine having a plurality of cylinders, wherein a main injection process and a variable number of secondary injection processes assigned to the main injection process are carried out during one working cycle of a piston, a change of the number of secondary injection processes is initiated initially only for some of the cylinders, while the original number of secondary injection processes is maintained for the other cylinders. Subsequently, the proportion of the cylinders to which the change of the number of secondary injection processes is applied is increased.

As a result of the application according to the invention of the changed number of secondary injection processes only to a part of the cylinders and the maintenance of the original number of secondary injection processes for the remaining cylinders, the transition between the different numbers of secondary injection processes per working cycle of the piston or per associated main injection process is advantageously not carried out suddenly, but the transition of the number of secondary injection processes per associated main injection process from the original number to the changed number of secondary injection processes is gradual and smooth.

In this way, as seen over the entire number of cylinders of the internal combustion engine, that is to say on average, a plurality of states occur in which non-integral numbers of secondary injection processes are carried out per associated main injection process, as a result of which the disadvantages which would otherwise occur with a sudden transition of the secondary injection processes are advantageously avoided with regard to noise development, torque and performance output, rotational speed fluctuations and the ability to control the operation of the internal combustion engine.

According to the invention, it is therefore possible to carry out the transition between different numbers of secondary injection processes per working cycle of a piston continuously, in such a way that, overall, it results in a harmonious operation of the internal combustion engine even during the transitional phase between different numbers of secondary injection processes per working cycle of a piston or per associated main injection process.

The invention will be described below in greater detail with reference to the accompanying drawings:

DESCRIPTION OF AN EMBODIMENT OF THE INVENTION

Figure 1:
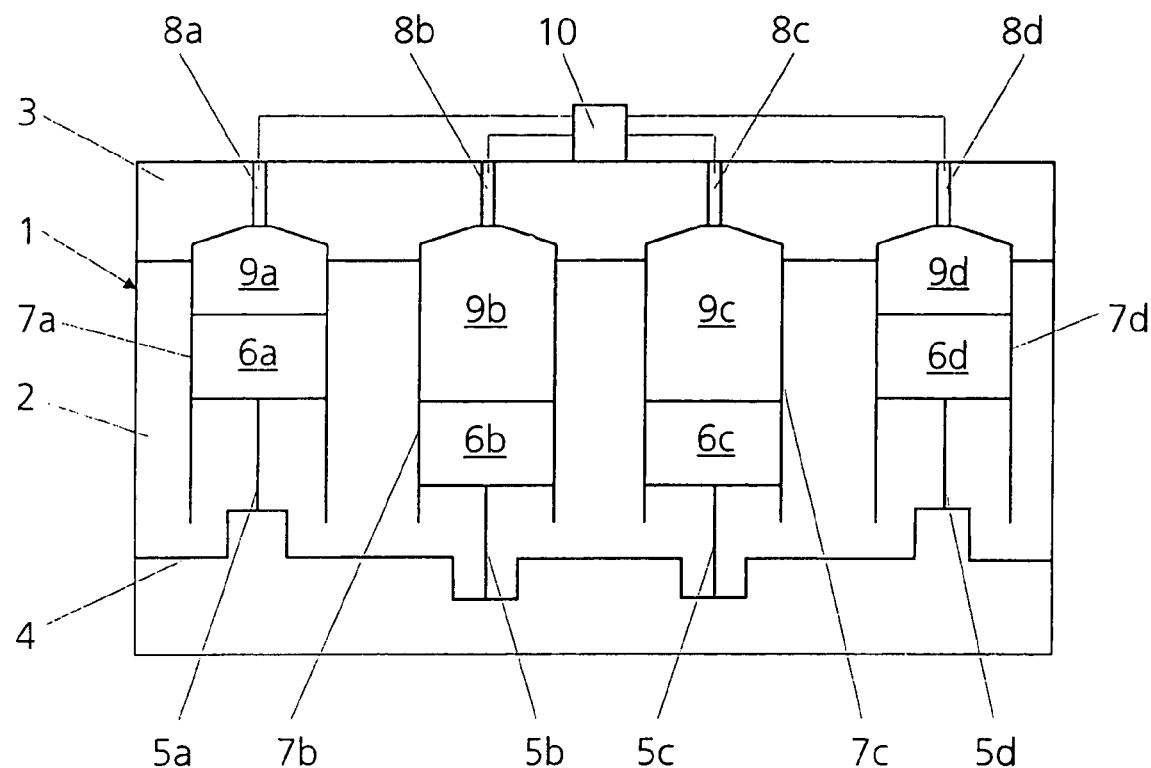
FIG. 1 shows schematically an internal combustion engine, in which the method according to the invention can be performed.

An internal combustion engine 1 has an engine block 2 and a cylinder head 3 which is attached to the latter. A crankshaft 4 on which, in the present case, a total of four connecting rods 5a–5d with associated pistons 6a–6d are arranged is mounted in the cylinder block 2. The pistons 6a–6d perform an oscillating movement in the respective cylinders 7a–7d. As will become clear in the following text, the internal combustion engine 1 could also have any other number of cylinders 7.

The cylinder head 3 is provided with injection valves 8a–8d which are assigned to each individual cylinder 7a–7d and are provided for the purpose of injecting fuel into the combustion chambers 9a–9d of the cylinders 7a–7d. In the present case, the internal combustion engine 1 is a direct-injection four-stroke internal combustion engine 1 operating according to the diesel principle. In internal combustion engines 1 of this type, it has proven advantageous with regard to noise development and accurate operation to perform one or more pre-injection processes during the working cycle of the pistons 6a–6d, that is to say in the present case during two oscillation movements of the respective piston 6a–6d or during two revolutions of the crankshaft 4, in addition to the respective injection process for the main fuel amount which will be called the main injection process in the following text. In addition, it is also possible to carry out injection processes after the main injection process, what are known as "post-injection processes". In the following text, pre-injection processes and post-injection processes are summarized under the term "secondary injection processes".

A pre-injection process, which is sometimes also referred to as pilot injection, or a postinjection process can be selected in ways which have already been described extensively in the prior art. The injection is controlled by a controller 10 which is connected to the injection valves 8a–8d.

Figure 2:
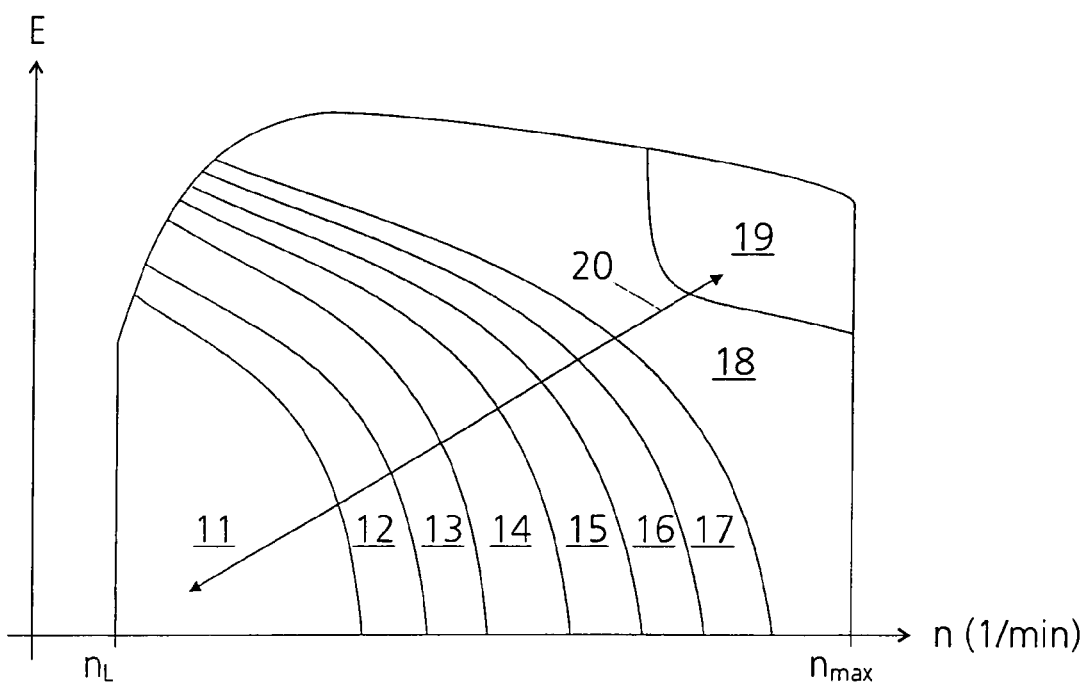
FIG. 2 shows a diagram illustrating the step by step transition between different numbers of secondary injection processes during the working cycle of a piston.

The number of secondary injection processes per working cycle of a respective piston 6a–6d can be varied, depending on the load state of the internal combustion engine 1, which is likewise already known in principle from the prior art. FIG. 2 illustrates this using a diagram, in which the amount of fuel E which is injected overall into one of the combustion chambers 9a–9d during one injection procedure (that is to say the main injection process and optionally one or more secondary injection processes) is plotted against the rotational speed n of the crankshaft 4 of the internal combustion engine 1.

In order to provide for less noise, improved torque and performance output, lower rotational speed fluctuations and improved exhaust-gas behavior in an associated main injection process during a transition between different numbers of secondary fuel injection processes, a concurrent sudden jump in the number of secondary injection processes is prevented using the method which is described in the following text. For this purpose, when it is necessary to change the number of secondary injection processes carried out per working cycle a piston 6a–6d or per associated main injection process, the change in number of secondary injection processes is initiated only for some of the cylinders 7a–7d, while the original number of secondary injection processes is maintained in the other cylinders 7a–7d. This leads to a gradual change of the number of secondary injection processes in the cylinders 7a–7d of the internal combustion engine 1, the changed number of secondary injection processes being carried out initially for a relatively small proportion of the cylinders 7a–7d and subsequently for a relatively large proportion of the cylinders 7a–7d, in order to achieve a gradual transition.

For example, if the number of secondary injection processes per associated main injection process is to be changed from two secondary injection processes to one secondary injection process, it is initially possible, for example, for only one secondary injection process to be carried out only in the cylinder 7d and for two secondary injection processes to continue to be carried out in the cylinders 7a–7c.

In accordance with the formula $NE=2-1/z$, where NE is the number of secondary injection processes per associated main injection process as seen across all the cylinders 7 of the internal combustion engine 1, that is to say for the mean number of secondary injection processes, and z is the number of cylinders 7 of the internal combustion engine 1, the mean number of secondary injection processes per two revolutions of the crankshaft 4, that is to say per working cycle of one of the pistons 6a–6d or per associated main injection process, is reduced in this way to 1.75 secondary injection processes. This number of secondary injection processes can be reduced further to $NE=2-2/z$, $NE=2-3/z$ as far as $NE=2-z/z$, that is to say to one secondary injection process per associated main injection process.

If a transition is to be reduced from one secondary injection process per main injection process to zero secondary injection processes per main injection process, this can be carried out in accordance with the equations $NE=1-1/z$, $NE=1-2/z$ as far as ultimately $NE=1-z/z$.

In this way, different numbers of mean secondary injection processes are obtained for different load ranges between an idling rotational speed $n_L$ and a maximum rotational speed $n_{max}$ of the internal combustion engine 1. The number NE of mean secondary injection processes per associated main injection process results from the fields 11 to 19 in the diagram according to FIG. 2. Of course, this diagram should be seen only as an example.

The following table shows an example for a possible sequence for reducing the secondary injection processes in an internal combustion engine 1 having four cylinders 7a–7d. The profile which is specified in the table follows a line 20 which extends through the fields 11 to 19 of the diagram according to FIG. 2, that is to say from a low rotational speed to a high rotational speed and from a small injection amount to a high injection amount:

| Field | Number of mean secondary injection processes NE | Number of secondary injection processes per cylinder Z | | | |
|---|---|---|---|---|---|
| | | 7a | 7b | 7c | 7d |
| 11 | 2 | 2 | 2 | 2 | 2 |
| 12 | 1.75 | 2 | 2 | 2 | 1 |
| | | 1 | 2 | 2 | 2 |
| | | 2 | 1 | 2 | 2 |
| | | 2 | 2 | 1 | 2 |
| | | 2 | 2 | 2 | 1 |
| | | etc. | | | |
| 13 | 1.5 | 2 | 2 | 1 | 1 |
| | | 1 | 2 | 2 | 1 |
| | | 1 | 1 | 2 | 2 |
| | | 2 | 1 | 1 | 2 |
| | | 2 | 2 | 1 | 1 |
| | | etc. | | | |
| 14 | 1.25 | 2 | 1 | 1 | 1 |
| | | 1 | 2 | 1 | 1 |
| | | 1 | 1 | 2 | 1 |
| | | 1 | 1 | 1 | 2 |
| | | 2 | 1 | 1 | 1 |
| | | etc. | | | |
| 15 | 1 | 1 | 1 | 1 | 1 |
| | | etc. | | | |
| 16 | 0.75 | 0 | 1 | 1 | 1 |
| | | 1 | 0 | 1 | 1 |
| | | 1 | 1 | 0 | 1 |
| | | 1 | 1 | 1 | 0 |
| | | 0 | 1 | 1 | 1 |
| | | etc. | | | |
| 17 | 0.5 | 0 | 0 | 1 | 1 |
| | | 1 | 0 | 0 | 1 |
| | | 1 | 1 | 0 | 0 |
| | | 0 | 1 | 1 | 0 |
| | | 0 | 0 | 1 | 1 |
| | | etc. | | | |
| 18 | 0.25 | 0 | 0 | 0 | 1 |
| | | 1 | 0 | 0 | 0 |
| | | 0 | 0 | 1 | 0 |
| | | 0 | 0 | 0 | 1 |
| | | etc. | | | |

-continued

| Field | Number of mean secondary injection processes NE | Number of secondary injection processes per cylinder Z | | | |
|---|---|---|---|---|---|
| | | 7a | 7b | 7c | 7d |
| 19 | 0 | 0 etc. | 0 | 0 | 0 |

The method described is suitable for internal combustion engines 1 having a wide range of different numbers of cylinders 7, the mean secondary injection processes NE which are possible in each case based on the overall number z of cylinders 7 being shown in the following table rounded up to two decimal points:

| Number z of cylinders 7 | Transitional range of the mean secondary injection processes NE per associated main injection process | | | | | | | |
|---|---|---|---|---|---|---|---|---|
| 3 | 2 | 1.67 | 1.33 | 1.0 | 0.67 | 0.33 | 0 | |
| 4 | 2 | 1.75 | 1.5 | 1.25 | 1.0 | 0.75 | 0.5 | 0.25 | 0 |
| 5 | 2 | 1.8 | 1.6 | 1.4 | 1.2 | 1.0 | 0.8 | 0.6 | etc. |
| 6 | 2 | 1.83 | 1.67 | 1.5 | 1.33 | 1.17 | 1.0 | 0.83 | etc. |
| 8 | 2 | 1.88 | 1.75 | 1.63 | 1.5 | 1.38 | 1.25 | 1.13 | etc. |
| etc. | | | | | | | | | |

With a larger number of cylinders 7 of the internal combustion engine 1, there is a change from the original step by step transition to an approximately continuous transition of the number of secondary injection processes per associated main injection process. The method described can be used not only for the reduction of the number of secondary injection processes but also for an increase. In order to clarify this, the line 20 in FIG. 2 is shown as a double arrow. Furthermore, it becomes clear that, in the event of a higher number z of cylinders 7 of the internal combustion engine 1, the first table would merely need to have appropriate columns added to it on the right-hand side.

The method described can also be used when more than two pre-injection processes and/or post-injection processes are carried out. Moreover, it is possible to carry out a cyclic or anti-cyclic change if there are different numbers of secondary injection processes per working cycle of the piston 6.

The invention claimed is:

1. A method of injecting fuel into the combustion chambers of an internal combustion engine having a plurality of cylinders, by a main injection process and a variable number of secondary injection processes assigned to the main injection process, all carried out during one working cycle of a piston, said method comprising the steps: for changing the number of secondary injection processes per associated main injection process, initiating the change in number of secondary injection processes only for some the cylinders (7a–7d), while maintaining the original number of secondary injection processes for the other of the cylinders (7a–7d), the changed number of secondary injection processes being effected initially for a small proportion of the cylinders (7a–7d) and then increasing the proportion of the cylinders (7a–7d) subjected to the changed number of injection processes.

2. The method as claimed in claim 1, wherein the number of secondary injection processes per working cycle of the piston (6) is reduced from two or more per associated main injection process to zero per associated main injection process in a stepwise fashion.

3. The method as claimed in claim 1, wherein the number of secondary injection processes per working cycle of the piston (6) is increased from zero per associated main injection process to two or more per associated main injection process in a stepwise fashion.

4. The method as claimed in claim 1, wherein a pre-injection process is carried out as a secondary injection process.

5. The method as claimed in claim 1, wherein a post-injection process is carried out as secondary injection process.

6. The method as claimed in claim 1, wherein a cyclic or anti-cyclic change is carried out in the case of different numbers of secondary injection processes per working cycle of the piston (6).

* * * * *